June 10, 1969  J. P. HALL  3,448,920
PARALLAX CORRECTION COMPUTER
Filed Aug. 4, 1967  Sheet 2 of 2

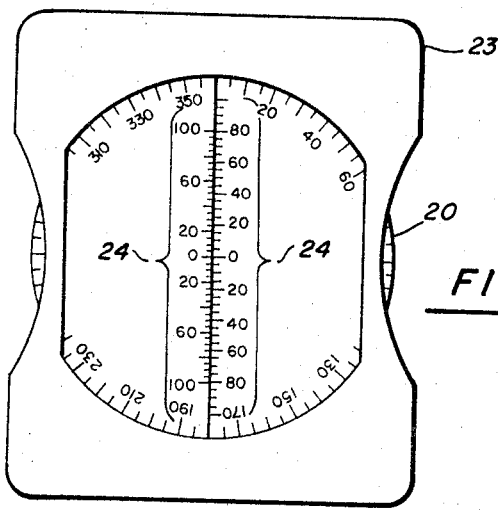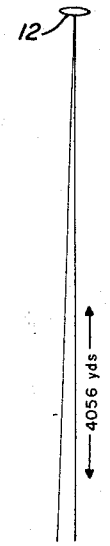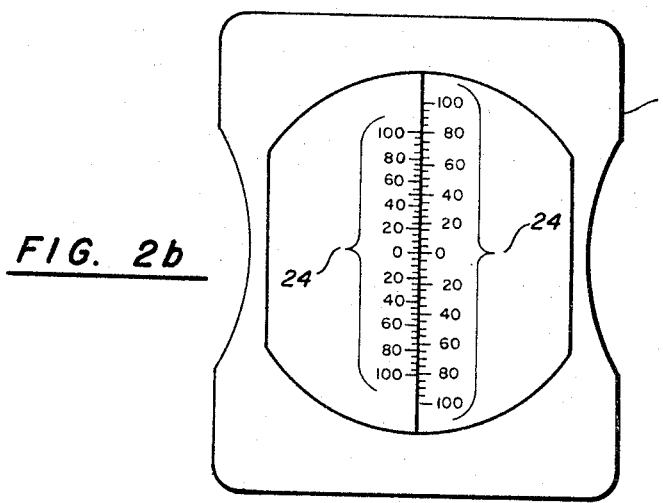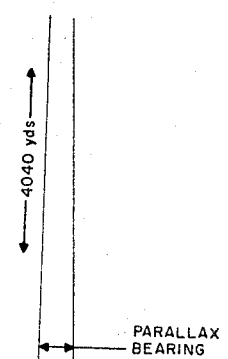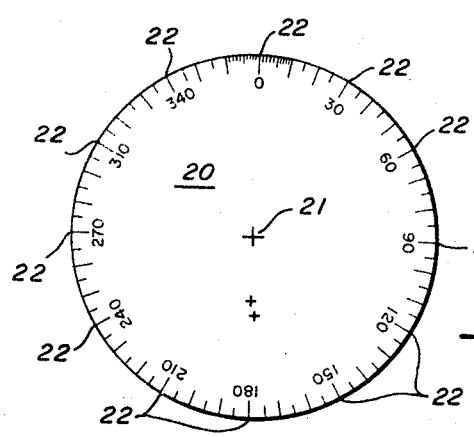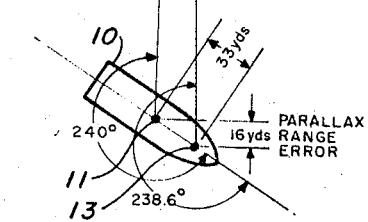

INVENTOR.
JOHN P. HALL
BY
ATTORNEYS

United States Patent Office

3,448,920
Patented June 10, 1969

3,448,920
PARALLAX CORRECTION COMPUTER
John P. Hall, San Diego, Calif., assignor, by mesne assignments, to the United States of America as represented by the Secretary of the Navy
Filed Aug. 4, 1967, Ser. No. 658,986
Int. Cl. G06c 1/00
U.S. Cl. 235—61                                                    6 Claims

ABSTRACT OF THE DISCLOSURE

This disclosure is concerned with a device for quickly and accurately computing the parallax corrections which must be made because of parallax errors introduced between first and second points relative to a remote point by reason of displacement of the first point from the second point. The present disclosure employs a circular scale having a center indicium and incremental azimuthal indicia disposed relative to that center indicium. Typically the incremental azimuthal indicia may be divided down into appropriate increments representative of zero through 360 degrees. A base member is provided which receives and rotatably supports the circular scale. The base member supports the circular scale in such a position that the center of rotation of the circular scale is coincident with a central point on the base member structure.

The base member also has a distance scale disposed along a fixed axis and divided into appropriate increments representative of distance in terms of yards, for instance. The distance scale on a base member is intended to be representative of linear distance between first and second points which may be either known or determinable. A third element, preferably in the form of a slide, is adapted to be received by the base member and is provided with a central axis slidably aligned with the fixed axis of the distance scale disposed on the base member. The slide member has radial indicia disposed angularly relative to its central axis. The slide also includes distance indicia substantially in the form of chords of circles disposed concentrically and representative of distances from one of the first or second points to the remote point.

Background of the invention

A remote point may be viewed or sensed as by sonar, radar, or visual alignment, for example, from a first point and the angle, as well as the distance from the first point to the remote point, may be determined. However, when it is desired to determine the position of a second point relative to the remote point, a certain amount of parallax error is introduced. This parallax error may comprise a distance error as well as an angular error, each of which must be calculated and compensated for relative to the angular and linear disposition of the remote point as viewed from the first point.

When a target is viewed or sensed by radar, for example, the distance of a target may be calculated as well as its angular disposition relative to the radar transmitter and receiving apparatus. If, however, it is desired to direct another apparatus to the target at the remote point, parallax error with respect to distance and angle may be introduced by reason of the spacial disposition of the second point relative to the first point. Typically, the first point may be a radar apparatus and the second point may be sonar, a second radar, a fire control point, etc. The usual method of calculating such parallax errors requires trigonometric calculation involving at least two sides of a known triangle as defined (1) from the first point to the remote point, and (2) from the first point to the second point. With these two distances and the angular disposition known, the corrected angle from the second point to the remote point, as well as the distance therebetween, may be trigonometrically calculated. However, such calculations are time consuming, subject to human error, and involve considerable training of personnel in order to accurately complete the solutions as required.

The present invention provides a device and apparatus which is simple to use, highly accurate within known and acceptable limits, and provides both angular and distance parallax corrections for the parallax errors introduced by reason of first and second points which are displaced from each other, the distance and angle being known or determinable from only one of the first or second points to a common remote point.

Accordingly, it is a primary object of the present invention to provide a parallax correction computing device which is capable of quickly and accurately computing both the distane and angular parallax corrections introduced by the displacement of one point from another when the distance and angular disposition from one of such points is known or determinable relative to a remote point.

Another important object of the present invention is to provide such a parallax error computing device where the indicia employed to calculate such parallax error corrections may be expanded by a factor which facilitates ease of use and accuracy of the calculations so made.

Another object of the present invention is to provide a parallax error computer which is adapted to receive different scales representative of different ranges of distances between a first and second sighting point and a remote point.

A further object of the present invention is to provide such a parallax error computer which includes multiple scales related to and adapted to cooperatively function relative to multiple scalar distances representative of different distances between one of the first and second points and a remote point to calculate the parallax error introduced therebetween, both as to angle and distance.

A further object of the invention is to provide a parallax error correction device which may be readily adapted to include a visual representation of a craft such as a surface vessel or aircraft, with the disposition of a known first point established thereon as well as the scalar distance to a second point shown and positioned thereon for use on a particular craft or vessel where the displacement between the two points and their relative angular disposition on the vessel is known or determinable and fixed in nature.

Summary of the invention

The parallax error computing device of the present invention preferably includes a circular scale having a center mark or indicium and incremental azimuthal indicia disposed circumferentially thereabout relative to the center marker or indicium. In the most usual case the azimuthal indicia will be representative of a known disposition of a remote point relative to one of a first and second points which are displaced from each other by a known or determinable distance. Conventionally, the azimuthal indicia will take the form of inceremental graduations between zero and three hundred and sixty degrees. The circular scale is preferably received in and rotatably supported by a base member which has a distance scale disposed along a fixed axis, the center of the fixed axis distance scale being arranged to be coincident with the center indicium of the circular scale. This coincidence of center points is employed in the computer of the present invention to represent the point from which the distance and angular disposition of a remote point is known or determinable.

Most commonly, in its preferred embodiment, the distance scale is indicated on the base member by being inscribed or printed upon a transparent face. The base member is configured and adapted to receive a slide member for linear movement parallel to the previously mentioned fixed axis distance scale disposed on the base member. The slide has a central axis which is aligned with the fixed axis of the base member and has radial indicia disposed angularly relative to its fixed axis. These radially disposed indicia are indicative of the angular disposition of the first and second points relative to the remote point. Distance indicia representative of the distance from either the first or the second point to remote point, are disposed generally as chords of concentric circles, the center of the circles being coincident with a point along an extension of the fixed axis previously described.

In use, the parallax error computer is adapted by reason of the movable relationship of its circular scale and the slide received in the base member to adjustably align a distance or range indicium or mark of the slide with the central indicia of the base member and circular scale, rotate the circular scale in accordance with the angular disposition of the remote point with respect to one of the two points respecting which parallax error is being calculated, and read from the computer both the distance correction and angular correction for the distance and angular disposition of the second point relative to the remote point as calculated from the known distance and known angular disposition of the first point relative to the remote point. The calculation is highly accurate within reasonable limits, is very rapid, and requires a minimum of instruction in the use of the device and virtually no understanding of the trigonometric principles on which it is based.

Moreover, in accordance with a most important feature of the concept of the present invention, the scales of the interacting and cooperative members of the assembly may be expanded in a particular co-acting relationship so as to afford a more easily readable and more highly accurate reading as desired.

Additionally, a multiplicity of scales may be provided on the slide member which is adapted to be received by the base member, providing a wide variety of distances or ranges such as may be encountered in the use of the parallax error computer of the present invention.

These and other objects, advantages, and features of the present invention will be more fully understood from the following description of a preferred embodiment together with the drawings, and the scope of the invention will be more particularly pointed out in the appended claims.

*Brief description of the drawings*

In the drawings:

FIG. 1 is an illustration of the type of parallax error problem which the computer of the present invention is designed to compute and solve;

FIGS. 2a, 2b, 2c, and 2d are views of the several co-acting parts of the typical preferred embodiment of the present invention;

Figure 2C:
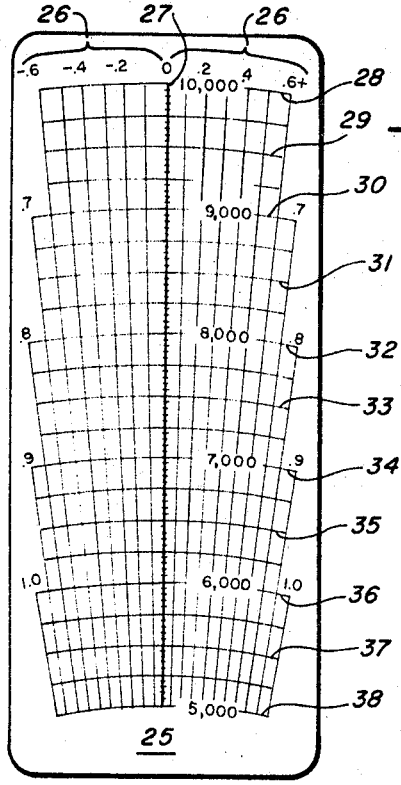

In order to facilitate understanding of the type of problem which the parallax error computer of the present invention solves, a typical application is illustrated in FIG. 1. For instance, on board a surface vessel such as ship 10, a radar equipment could be installed as indicated at location 11 aboard the ship 10. The radar may be directed at a target or location such as indicated at the remote point 12. At a second point 13 on the ship 10, displaced some distance from the first point 11, a second installation may be present, such as a sonar, for example, or a fire control point. Assuming for purposes of illustration that the ship 10 is angularly disposed from the remote point 12, substantially as illustrated in FIG. 1, it can be appreciated that the remote point 12 bears a different angular disposition relative to point 13 than it does to point 11. It is also evident that because of the angular disposition of the ship 10, the second point 13 is slightly closer to the remote point 12 than in the point 11. Accordingly, the range determined by a radar equipment installed at point 11 aboard the ship 10 relative to the remote point 12 must be corrected to provide a correct range reading from point 13. Similarly, for equally obvious reasons, the bearing which is determined at the radar equipment point 11 is slightly different from the bearing of the second point 13 relative to the same remote target 12.

It can be calculated through trigonometric processes that if the remote point 12 which may be a target, for example, is 4040 yards in range from the radar equipment 11 at a bearing of 240 degrees and the second point 13 aboard the craft 10 is displaced 33 yards from point 11 which was the source of the range and bearing information, the range to the second point 13 would have to be corrected by 16 yards to 4056 yards and the bearing from point 13 to the target would have to be corrected by approximately 1.4 degrees to a corrected 238.6 degrees. The details of the trigonometric calculations will not be given here since they are obvious to those skilled and knowledgeable in the state of the art in solving the type of problem presented in the illustration of FIG. 1. It is, however, equally obvious to one skilled in the art that such trigonometric calculations are not instantaneously realizable in practice and usually require reference books in the form of trigonometric tables as well. Such calculations are subject to human error and therefore are not inherently fully reliable unless verified by additional calculations.

In making such calculations and in using trigonometric tables, certain assumptions may be reasonably made wtihin the limitations of certain concomitant conditions. For example, for relatively small angles, i.e., five degrees, it may be assumed that the tangent function and the sine function are substantially the same. That is to say, that the sine and tangent functions for small angles are substantially the same except for third and fourth place figures. This assumption may be incorporated in the operation of the preferred embodiment of the present invention as is illustrated in drawings of FIGS. 2, 3, and 4.

FIGS. 2a, 2b, and 2c illustrate the several members which comprise the parallax error computer of the present invention. As illustrated in FIG. 2a, one of the principal members of an assembly of a preferred embodiment of the present invention comprises a circular scale 20 having a center indicium 21 which may take the shape of a small cross mark or plus sign as shown. Disposed about the circumference of the circular scale 20, are incremental azimuthal indicia 22, arranged to read in terms of degrees from 0 degrees to 360 degrees relative to rotation about the center indicium 21.

As illustrated in FIG. 2b, a base member 23 is adapted to receive and rotatably support the circular scale 20 for rotation about its center indicium 21. The base member 23 also has one or more distance scales such as illustrated at 24. The scales 24 each have a center as indicated by the zero numerical designation which center is coincident with and aligned upon the center indicium 21 of the rotatably supported circular scale 20, as shown in FIG. 2d.

As illustrated by FIG. 2c, a third member 25 comprises a slide which is adapted to be received by the base member 23 and to be slidably moved in a linear direction parallel to the fixed axis of the distance scale 24 previously described. In the preferred embodiment of the present invention, the entire face of the base member upon which the distance scale 24 is inscribed or imprinted is desirably transparent and the circular scale 20 is also preferably transparent so that the slide member 25 with its markings and indicia may be clearly viewed through both the transparent portion of base member 23 and the circular scale 20.

The slide member 25 has a central axis as indicated below the zero numerical designation by the heavy line indicated at 27, which heavy line is arranged to be slidably positioned beneath the central axis 24 of the base member 23. A plurality of radial indicia, as indicated generally at 26 are disposed about the central axis 27. In substantially orthogonal relationship to the radial lines, there are a plurality of lines in the form of segmented chord portions of circles 28 through 38 which are concentric and have a center along the central axis 27. These line indicia indicate range or distance as shown at 28 indicating 10,000 yards, 29 indicating 9,500 yards, 30 indicating 9,000 yards, 31 indicating 8,500 yards, 32 indicating 8,000 yards, 33 indicating 7,500 yards, 34 indicating 7,000 yards, 35 indicating 6,500 yards, 36 indicating 6,000 yards, 37 indicating 5,500 yards, and 38 indicating a 5,000 yard range.

In accordance with a more important aspect and feature of the present invention the distance or yardage scale as shown in FIG. 2c indicating from 5,000 yards to 10,000 yards, may be expanded by a factor relative to the fixed scale of the base member as indicated in 24 and the angular disposition of the radial lines 26 expanded angularly by the same factor so as to render improved ease of operation and at a higher degree of accuracy in the use of the parallax error computer.

*Operation of the preferred embodiment*

Figure 3:
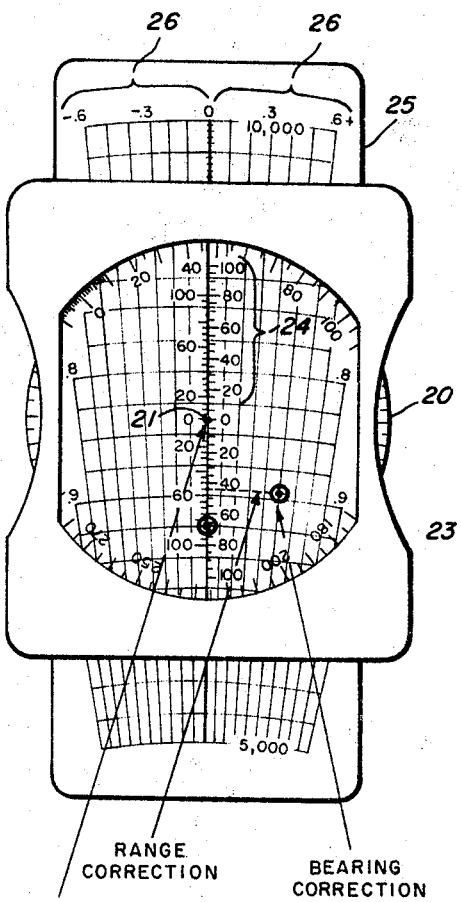
FIG. 3 is an assembled view of a typical embodiment of the present invention.

FIG. 3 shows an assembled view of a preferred embodiment of the present invention in which the base member 23, the circular scale member 20, and the slide member 25 are assembled for use. The computer device is operated in the following manner. Firstly, an appropriate scale is selected from several which may be available on alternate slide members. The slide member is inserted into the base member and the parallax distance, i.e., the distance between the first known point and the second known point, as, for instance, between two positions on a craft or ship, is located on the rotatable circular scale member with reference to the fixed distance scale of the base member. When the distance is located such as, for illustrative purposes, a distance of 65 yards on the right hand lower scale of FIG. 3, a small dot may be printed as indicated within the circle; the known range to the target as located on the scale of the slide 25 is then aligned with the zero point 21 of the fixed distance scale 24 of the base member 23. The rotatable circular member 20 is then rotated to the appropriate bearing of the plurality of indicia 22 as determined from the angular disposition of the remote point or target relative to the known point aboard ship. In the particular instance given as an example of this operation in FIG. 3, the bearing is illustrated by being set at 47 degrees.

By reason of rotation of the circular scale member 20, the marked point on the rotatable circular scale member 20 has now moved in an arc around the central point of rotation 21 to the right and is somewhat upward from its starting point. This new disposition of the marked point, as shown within the small circle, now gives a bearing correction and range correction to compensate for the parallax error due to the linear displacement between the first and the second point and the relative angles of each of the first and second points in respect of the remote point. Thus, the bearing correction is 0.5 degree as illustrated in FIG. 3, the 0.5 degree being read off the upper scale, and the range correction is 43 yards as read laterally across to the fixed scale of the base member 23.

As indicated on the device of the present invention, in the several illustrative drawings the range or distance corrections are read in + and — increments, as similarly are the bearing changes which are read in + and — increments as indicated on the top of the slidable member 25. Accordingly, it may be readily appreciated that the device of the present invention is straightforward, uncomplicated, and simple in use, thus facilitating the training of personnel. It involves no trigonometric calculations inasmuch as the relationships of the various scales of the several members comprising the assembly and their coaction performs the trigonometric calculation function which would otherwise require lengthy mathematical steps, as well as the use of reference books such as trigonometric tables.

Figure 4:
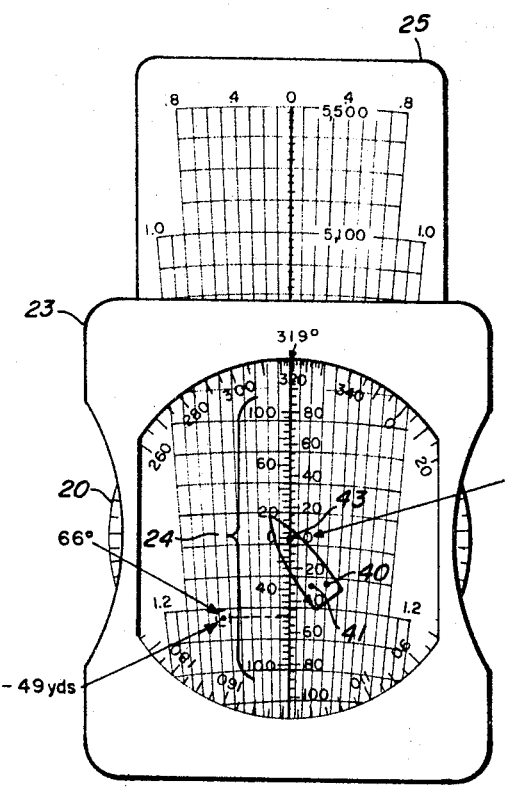
FIG. 4 is an illustration of an embodiment of the present invention as modified for use on a particular kind of vessel.

FIG. 4 shows an alternative preferred embodiment of the present invention in which the circular scale member 20 includes the outline or silhouette of a craft, vessel, or other location of the first and second displaced points with respect to which the parallax error correction is to be calculated. The point from which bearing and range may be determined relative to a target or other remote point, is positioned on the silhouette at the center of the fixed distance scale 24 and at the coincident center of rotation of the circuit scale member 20. Any other known point aboard the craft or vessel may be designated such as the points shown at 40 and 41 so that once the bearing and range information has been entered from the known point 43 aboard the craft, the necessary bearing and range corrections may be directly determined with respect to points 40 and 41. The same technique may be used for any other known points aboard the craft displaced from the known point 43 by establishing their relative disposition using the fixed distance scale 24 of the base member 23 and performing the sequence of steps previously described.

It may be desirable in accordance with the limitations of size to expand the angular scale of the slide member by a factor of five or ten times, similarly expanding the distance scale of the slide member by a factor of five or ten times, respectively, relative to the fixed distance scale on the base member.

For example, the slide member 25 as illustrated in FIG. 3 has its scale angularly expanded by a factor of ten and its linear distance scale (reading up and down) similarly expanded by a factor of ten relative to the left-hand fixed scale on the face of base member 23. The scale member 25 of the computer assembly shown in FIG. 4 is graphically expanded relative to its associated fixed scale on the right-hand side of base member 23 by a factor of five. This arrangement gives a greatly improved readability and a high degree of accuracy as well as facilitating the use of the computer device of the present invention.

It is to be understood that the present invention may be used with respect to any two known points, one of which will provide known range or distance information with respect to a remote point and bearing information such as may be determined from a compass bearing for example. Moreover, the present invention is not limited to use aboard ship or other surface vessel, but may be equally as well employed at a fixed position or aboard an aircraft or any other type of craft where similar problems of parallax correction are encountered.

What is claimed is:

1. A device for computing angular and distance parallax error between first and second points relative to a remote point by reason of the displacement of the first point from the second point, comprising:
   a circular scale having a center indicium and incremental azimuthal indicia disposed relative to said center indicium,
   said azimuthal indicia being representative of a known disposition of said remote point relative to one of said first or second points;
   a base member having a distance scale disposed along a fixed axis, representative of the distance between said first and second points, and configured to rotatably support said circular scale with its center indicium aligned with the center of said distance scale; and a slide adapted to be received by said base member for linear movement parallel to said fixed axis, said slide having a central axis slidably aligned with said base member fixed axis and having radial indicia disposed angularly relative thereto, and distance indicia representative of distances from one of said first or second points to said remote point.

2. A device for computing parallax error as claimed in claim 1 wherein said radial indicia are angularly expanded by a factor equal to the expansion factor of said distance indicia relative to said base member distance scale.

3. A device for computing parallax error as claimed in claim 1 and including at least first and second base member distance scales disposed along a fixed axis as representative of distances between said first and second points.

4. A device for computing parallax error as claimed in claim 3 wherein said first and second base member distance scales represent different distances between said first and second points per unit length of said scales.

5. A device for computing parallax error as claimed in claim 4 wherein first and second radial indicia are included on said slide, each angularly expanded by a factor equal to the expansion factor of associated distance indicia on said slide relative to a respective base member distance scale.

6. A device for computing parallax error as claimed in claim 1 and including a visual representation of a craft on said circular scale, said representation being disposed with the scalar location of a sensing means coincident with its center of rotation, and at least one other location disposed at its relative scalar position on said representation.

References Cited

UNITED STATES PATENTS

| | | | |
|---|---|---|---|
| 2,756,929 | 7/1956 | McGee | 235—61 |
| 2,823,857 | 2/1958 | Heitor | 235—61 |
| 2,916,207 | 12/1959 | Vohland | 235—61 |
| 3,112,875 | 12/1963 | Van Caro et al. | 235—70 |
| 3,231,188 | 1/1966 | Warner | 235—61 |

STEPHEN J. TOMSKY, *Primary Examiner.*